(12) United States Patent
Ishikawa

(10) Patent No.: US 8,040,106 B2
(45) Date of Patent: Oct. 18, 2011

(54) METHOD OF CONTROLLING BATTERY CHARGING

(75) Inventor: Yosuke Ishikawa, Farmington Hills, MI (US)

(73) Assignee: Honda Motor Co., Ltd., Tokyo (JP)

( * ) Notice: Subject to any disclaimer, the term of this patent is extended or adjusted under 35 U.S.C. 154(b) by 792 days.

(21) Appl. No.: 12/129,416

(22) Filed: May 29, 2008

(65) Prior Publication Data
US 2009/0295337 A1 Dec. 3, 2009

(51) Int. Cl.
*H01M 10/44* (2006.01)
*H01M 10/46* (2006.01)

(52) U.S. Cl. ........................................................ 320/132

(58) Field of Classification Search .................. 320/107, 320/132, 149; 324/426, 427, 430, 433; 340/635
See application file for complete search history.

(56) References Cited

U.S. PATENT DOCUMENTS

| | | | |
|---|---|---|---|
| 5,888,665 A * | 3/1999 | Bugga et al. ................... | 429/499 |
| 5,982,152 A | 11/1999 | Watanabe et al. | |
| 6,074,771 A * | 6/2000 | Cubukcu et al. ............... | 429/465 |
| 6,215,281 B1 | 4/2001 | Koch | |
| 6,262,577 B1 | 7/2001 | Nakao et al. | |
| 6,362,598 B2 | 3/2002 | Laig-Horstebrock et al. | |
| 6,646,419 B1 | 11/2003 | Ying | |
| 7,227,336 B1 | 6/2007 | Van Schalkwijk et al. | |
| 7,248,023 B2 | 7/2007 | Takezawa et al. | |
| 2002/0117997 A1* | 8/2002 | Feil et al. ....................... | 320/132 |
| 2005/0189948 A1 | 9/2005 | Koch | |
| 2005/0214646 A1 | 9/2005 | Kubota | |
| 2006/0093894 A1 | 5/2006 | Scott et al. | |
| 2006/0208701 A1 | 9/2006 | Mikhaylik | |
| 2006/0238168 A1* | 10/2006 | Matsuo et al. ................. | 320/136 |
| 2008/0003490 A1 | 1/2008 | Christensen et al. | |
| 2010/0072955 A1 | 3/2010 | Ishikawa | |

FOREIGN PATENT DOCUMENTS

| | | |
|---|---|---|
| EP | 2048763 A1 | 4/2009 |
| JP | 10-290535 | 10/1998 |
| JP | 2006-158161 | 6/2006 |

OTHER PUBLICATIONS

G. Ning; B.N. Popov, "Cycle Life Modeling of Lithium-Ion Batteries," Journal of Electrochemical Society, vol. 151 (2004), pp. A1584-A1591.

S. Santhanagopalan, R.E. White, "Online estimation of the state of charge of a lithium ion cell," Journal of Power Sources, vol. 161 (2006), pp. 1346-1355, Elsevier, B.V.

* cited by examiner

*Primary Examiner* — Edward Tso
(74) *Attorney, Agent, or Firm* — Capitol City TechLaw, PLLC; Mark E. Duell

(57) ABSTRACT

The present teachings are directed toward methods of controlling the charging of a battery. The method includes the steps of receiving current and voltage output information for the battery during a charging/discharging cycle at a certain time interval, and using a model to determine both charging efficiency of the battery and the overpotential for a side reaction. These values for the charging efficiency and the overpotential of the side reaction are then compared to respective first and second given values. If either the charging efficiency or the overpotential is less than their respective given values, then the charging of the battery is suspended. The present method is particularly applicable to Li-ion batteries.

20 Claims, 6 Drawing Sheets

RELATIONSHIP BETWEEN
OVERPOTENTIAL AND CURRENT DENSITY

RELATIONSHIP BETWEEN
Js AND ηs

METHOD OF CONTROLLING BATTERY CHARGING

BACKGROUND

1. Field of the Invention

The present teachings relate to control systems, or methods directed to the control of the charging of a lithium-ion battery system. Such methods can employ algorithms which consider various internal battery parameters or states to determine charging conditions.

2. Discussion of the Related Art

One known technique, as presented in U.S. Pat. No. 5,982,152, directed to primarily to Ni-MH batteries, estimates charging efficiency based on the battery temperature increment and stops the charging operation when the charging efficiency is less than certain value. This technique can prevent unnecessary charging. Unneeded charging does not increase battery's state of charge but can lead to possible deterioration of the battery.

Conventionally, battery performance deterioration is addressed by adding an excess of electrode material and restricting the usable battery range. Such an approach results in a heavier and more expensive battery.

Clearly, a need exists for a Li-ion battery charging control system that measures and determines significant internal battery states and parameters to control the charging system, which can in turn, lead to a lighter and less expensive energy storage device, particularly for automotive applications.

SUMMARY

The present teachings are directed to a control method based on consideration of the deposition of solid material, which can be a Li-containing component, at the anode, or negative electrode, and formation of a solid-electrolyte interface to estimate the effect on battery charging efficiency, and on determination of the overpotential of an irreversible parasitic side reaction as parameters to control the charging cycle of a battery, particularly lithium-ion batteries.

The presently taught battery control method and algorithm can realize lighter and more inexpensive energy storage devices for automotive application by estimating the effect of an irreversible side reaction at the electrodes and suspending charging when the calculated charging efficiency is lower than given value.

The present teachings include a machine implemented method for controlling the charging of a battery that includes receiving current and voltage output information for the battery during a charging/discharging cycle at a certain time interval, using a model to determine both charging efficiency of the battery and the overpotential for a side reaction, and determining whether the charging efficiency is less than a first given value, and whether the overpotential of the side reaction is less than a second given value. The charging of the battery is suspended if either charging efficiency or overpotential is less than their respective given values.

Also taught by the present disclosure is a battery charging device for a battery including a battery, a battery charger for charging the battery, and a charging control means. The charging control means include receiving current and voltage output information for the battery during a charging/discharging cycle at a certain time interval, and using a model to determine both charging efficiency of the battery and the overpotential for a side reaction. The determined charging efficiency and overpotential of the side reaction are then compared to given first and second values, respectively, and the battery charging is suspended if either charging efficiency or overpotential is less than their respective given values.

Further teachings of this disclosure include a machine implemented method for controlling the charging of a battery by receiving current and voltage output information for the battery during a charging/discharging cycle at a certain time interval, using a model to determine charging efficiency of the battery, and determining whether the charging efficiency is less than a first given value. If the charging efficiency is less than the first given value, then suspending the charging of the battery. The machine implemented method further includes using the same model to determine the overpotential for a side reaction, comparing the overpotential of the side reaction to a second given value, determining if the overpotential is less than the second given value, and suspending the charging of the battery if either charging efficiency or overpotential is less than their respective given values.

An additional method taught by the present disclosure is a machine implemented method for controlling the charging of a battery which includes receiving current and voltage output information for the battery during a charging/discharging cycle at a certain time interval, using a model to determine the overpotential for a side reaction, and determining whether the overpotential of the side reaction is less than a first given value. The battery charging is suspended if the overpotential is less than the first given value. This method can further include using the model to determine charging efficiency of the battery, and determining whether the charging efficiency is less than a second given value. If either charging efficiency or the overpotential is less than their respective given values, then the charging of the battery is suspended.

One model used to estimate a battery's internal states is the Single Particle Battery model. This model is presented in detail in, at least, two technical papers, "Cycle Life Modeling of Lithium-Ion Batteries," G. Ning, B. N. Popov, Journal of Electrochemical Society 151 (2004), pages A1584-A1591, and "Online estimation of the state of charge of a lithium ion cell," S. Santhanagopalan, R. E. White, Journal of Power Sources 161 (2006), pages 1346-1355.

The presently taught methods and apparatus can use this model to calculate overpotential of an irreversible chemical reaction at the negative electrode, and charging efficiency to control battery charging.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
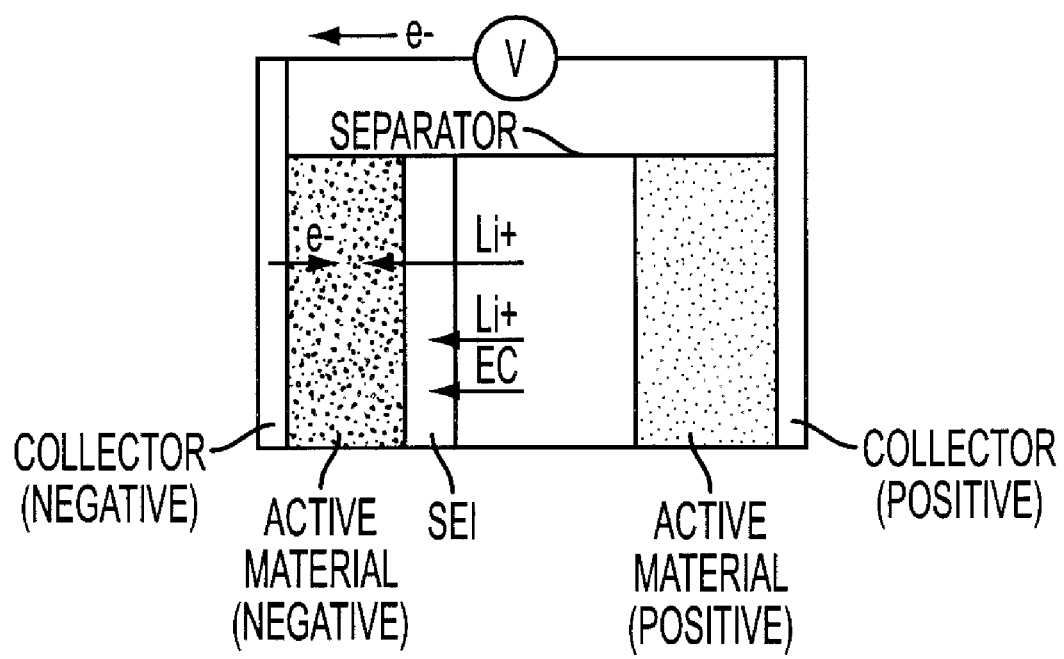
FIG. 1 is a schematic of a Li-ion battery.

A machine implemented method for controlling the charging of a battery is taught by the present disclosure. This method includes the steps of receiving current and voltage output information for the battery during a charging/discharging cycle at a certain time interval, and using a model to determine both charging efficiency of the battery and the overpotential for a side reaction. These values for the charging efficiency and the overpotential of the side reaction are then compared to respective first and second given values. If either the charging efficiency or the overpotential is less than their respective given values, then the charging of the battery is suspended.

The disclosed machine implemented method can be utilized with, for example, lithium ion batteries. The lithium ion battery can have a side reaction which is an irreversible parasitic side reaction involving the formation of deposits at the negative electrode. Examples of such deposits at the negative electrode include the reduction products of ethylene carbonate ("EC"), which is just one example of a reducible electrolyte component. The formation of a solid electrolyte interface ("SEI") at the negative electrode is primarily due to the reduction of electrolyte components, such as EC. These deposits can also include, for instance, various Li containing materials, such as, dilithium ethyl carbonate.

In this machine implemented method, the current and voltage output information can, in some embodiments, be constantly monitored. In some embodiments, the receiving of current and voltage output information can be repeated until charging is suspended.

This machine implemented method can utilize the known single particle battery model as a basis for calculating various internal battery states or internal parameters. These calculated states can then be used to control the charging or discharging cycle of the battery. Some of the additional internal parameters that can be calculated can include one or more members of the following group consisting of:

A) surface ion densities ($c^s$) at each one of the negative and positive electrodes, B) overpotentials ($\eta$) for the main charge transfer reaction at each of the positive electrode and negative electrode, and for the side reaction at the negative electrode;

C) current densities (J) for the main charge transfer reaction at each of the positive electrode and negative electrode, and for the side reaction at the negative electrode;

D) equilibrium potentials (U) for the main charge transfer reaction at each of the positive electrode and negative electrode, and for the side reaction at the negative electrode.

The presently disclosed method can also estimate the solid phase potentials for the electrodes ($\Phi n$ for the negative electrode and $\Phi p$ for the positive electrode) through the use of the single particle battery model.

The time interval at which the current and voltage output information is received can include any time period ranging from about 10 milliseconds to about 1 seconds.

A battery charging device for a battery is also taught by the present specification, and includes a battery, a battery charger for charging the battery, and a charging control means. The charging control means can include receiving current and voltage output information for the battery during a charging/discharging cycle at a certain time interval, using a model, such as, the single particle battery model, to determine both charging efficiency of the battery and the overpotential for a side reaction. A determination of whether the charging efficiency is less than a first given value, and whether the overpotential of the side reaction is less than a second given value is then made. If either charging efficiency or overpotential is less than their respective given values, then the control means calls for a suspension of the charging of the battery.

One embodiment of the presently disclosed battery charging device can include a generator. A suitable example of a generator is the generator as found in automotive applications, for instance, a generator of a hybrid electric vehicle. Hybrid electric vehicle refers to vehicles that can incorporate two different sources of drive train power, for instance, an electric motor, and additionally, an internal combustion engine, for example, a gasoline or diesel powered engine.

Another machine implemented method for controlling the charging of a battery is also disclosed by the present disclosure and includes the steps of receiving current and voltage output information for the battery during a charging/discharging cycle at a certain time interval, using a model to determine charging efficiency of the battery, determining whether the charging efficiency is less than a first given value, and suspending the charging of the battery if the charging efficiency is less than the first given value.

This method can further include using the model to determine the overpotential for a side reaction, determining whether the overpotential of the side reaction is less than a second given value, and suspending the charging of the battery if either charging efficiency or overpotential is less than their respective given values.

Yet another machine implemented method for controlling the charging of a battery is set forth herein, and includes receiving current and voltage output information for the battery during a charging/discharging cycle at a certain time interval, using a model to determine the overpotential for a side reaction. The overpotential of the side reaction can then be compared to a first given value, and if the overpotential is less than the first given value, then suspending the charging of the battery. This machine implemented method can further call for using the model to determine charging efficiency of the battery, determining whether the charging efficiency is less than a second given value, and suspending the charging of the battery if either charging efficiency or overpotential is less than their respective given values.

According to the presently disclosed methods, the single particle battery model can be used to estimate the internal battery parameters of the Li-ion battery, for instance. In this model, a simplification is made by assuming that the active materials at each electrode behave as a single particle. This simplification enables real time estimation of the battery mechanism and the various internal battery parameters, which can then be used to control the battery charge application.

It is generally known that formation and deposition of solid deposits can occur at the SEI of the negative electrode, and that this deposition is one of the causes of deterioration of a Li-ion battery system. These solid deposits can be Li-containing components. The deposition of Li-containing components and the reduction of electrolytes, such as EC, are generally considered as major contributors to these parasitic side reactions. Since Li ions are consumed in these side reactions, and thus do not contribute in subsequent discharge processes, the current generated in this process can be considered as a charging loss. A typical Li ion cell is illustrated in FIG. 1.

The presently taught method estimates the effect of this irreversible side reaction using the single particle battery model and suspends charging when either the calculated charging efficiency or overpotential of the side reaction is determined to be lower than a respective given value.

The single particle battery model uses Fick's Second Law to describe the diffusion of lithium into the active material at the electrodes:

$$\frac{dc_j^{avg}}{dt} + \frac{15D_{1,j}}{R_j^2}(c_j^{avg} - c_j^S) = 0 \tag{1}$$

$$c_j^{avg}|_{t=0} = c_j^0 \tag{2}$$

$$J_j^{Li} + \frac{5D_{1,j}}{R_j^2}(c_j^S - c_j^{avg})Fa_j = 0 \tag{3}$$

where
- $c_j^{avg}$ Average ion density at active material; j=n (negative); j=p (positive)
- $c_j^s$ Ion density at surface of active material; j=n (negative); j=p (positive)
- $J_j^{Li}$ Current density at each electrode; j=n (negative); j=p (positive)

Bulter-Volmer kinetics can be employed to represent the charge transfer reaction at the surfaces of the idealized spheres which are used to approximate the electrodes of the lithium ion cell.

$$J_j^{Li} = J_{j0}^{Li}\left\{\exp\left(\frac{\alpha_j^a F}{RT}\eta_j\right) - \exp\left(\frac{-\alpha_j^c F}{RT}\eta_j\right)\right\}, \quad j = n, p \tag{4}$$

$$\eta_j = \phi_j - U_j^{OCP} - J_j S_j R_j^f, \quad j = n, p \tag{5}$$

where
- $\eta_j$ Overpotential of charger transfer reaction; j=n (negative); j=p (positive)
- $\phi_j$ Solid phase potential at each electrode; j=n (negative); j=p (positive)
- $U_j^{OCP}$ Equilibrium potentials; j=n (negative); j=p (positive)

Figure 2:
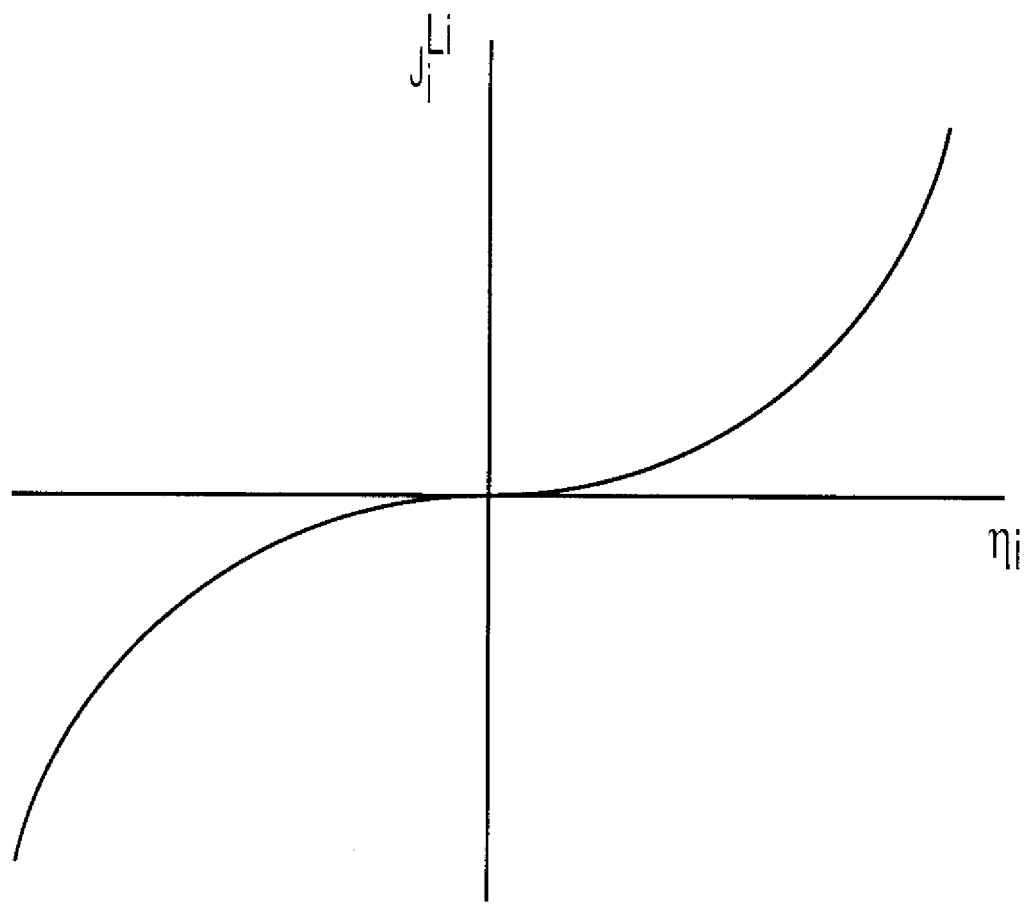
FIG. 2 is a graphical representation of the relationship between overpotential and current density.

The overpotential of the charge transfer reaction will be positive when the solid phase potential is greater than the equilibrium potential. This will drive the positive reaction current from the active material to the electrolyte as graphically set forth in FIG. 2.

Figure 3A:
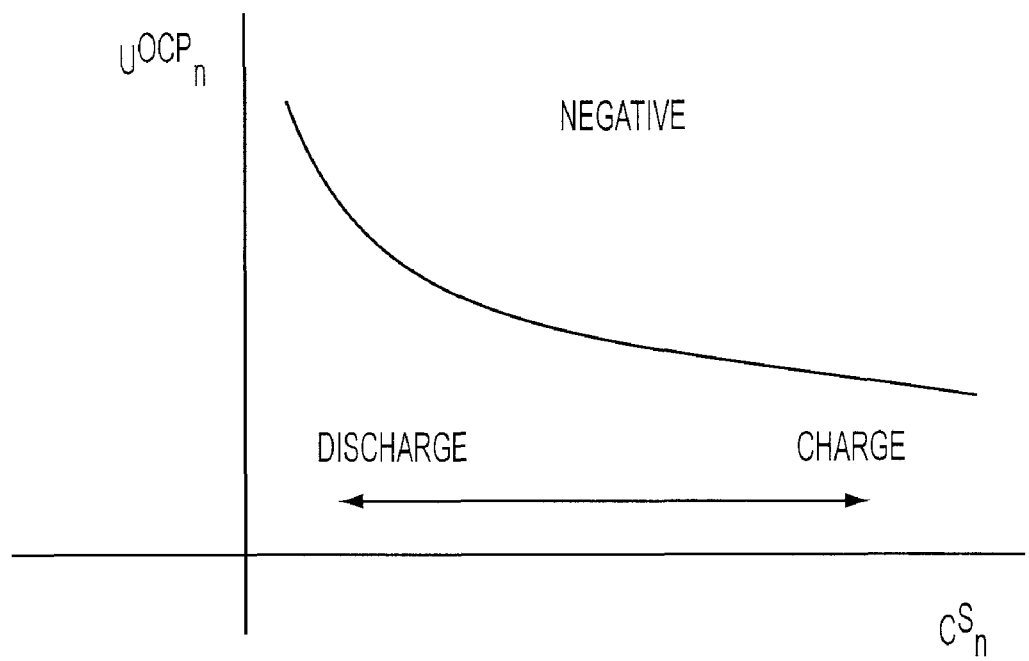
FIGS. 3A and 3B are graphical representations of the relationship between equilibrium potential and ion density for negative and positive electrodes, respectively.
Figure 3B:
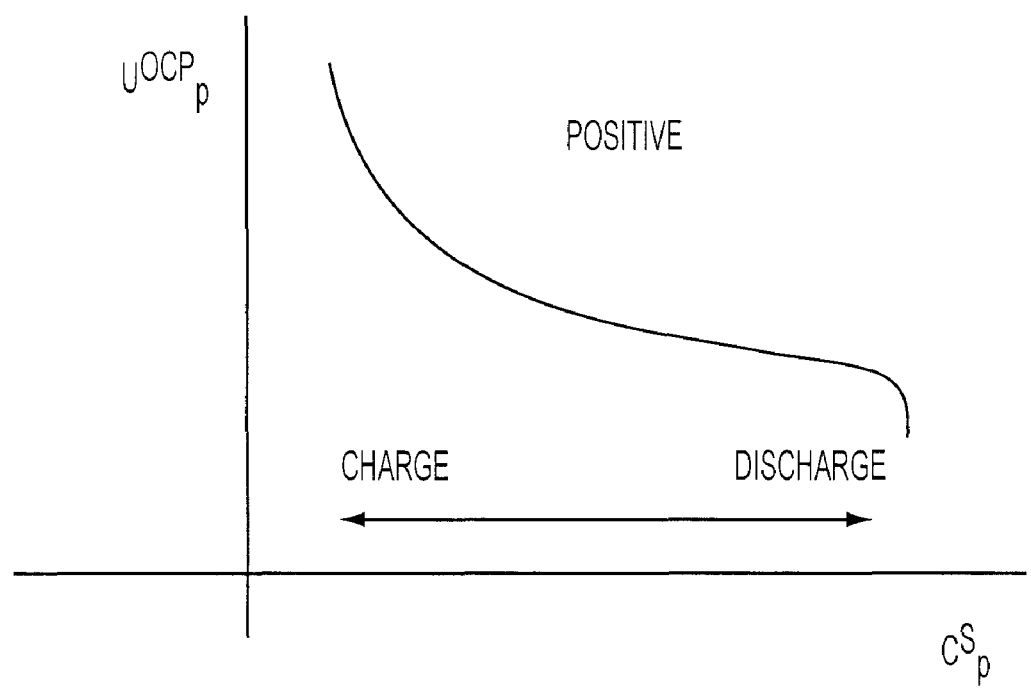

The equilibrium potentials of the respective negative and positive electrodes of a Li-ion battery are a function of ion density and have the characteristics as graphically set forth in FIGS. 3A and B.

The parasitic side reactions such as, Li deposition and solid-electrolyte interface formation, occur at the negative electrode when the overpotential for the side reaction becomes negative. The overpotential for the side reaction typically becomes negative under charging conditions. This reaction relationship is expressed with the following Bulter-Volmer equation:

$$J_s^{Li} = -J_{s0}^{Li}\exp\left(-\frac{\alpha_s^c nF}{RT}\eta_s\right) \tag{6}$$

$$\eta_s = \phi_n - U_s^{OCP} - J_n S_n R_n^f \tag{7}$$

where
- $J_S^{Li}$ Current density of the side reaction
- $\eta_S$ Overpotential of the side reaction
- $U_S^{OCP}$ Equilibrium of the side reaction The reaction current density, $J_S^{Li}$, of the side reaction becomes negative when $\eta_s$, the overpotential of the side reaction, is negative, and is considered a charging loss. The side reaction is typically irreversible.

Figure 4:
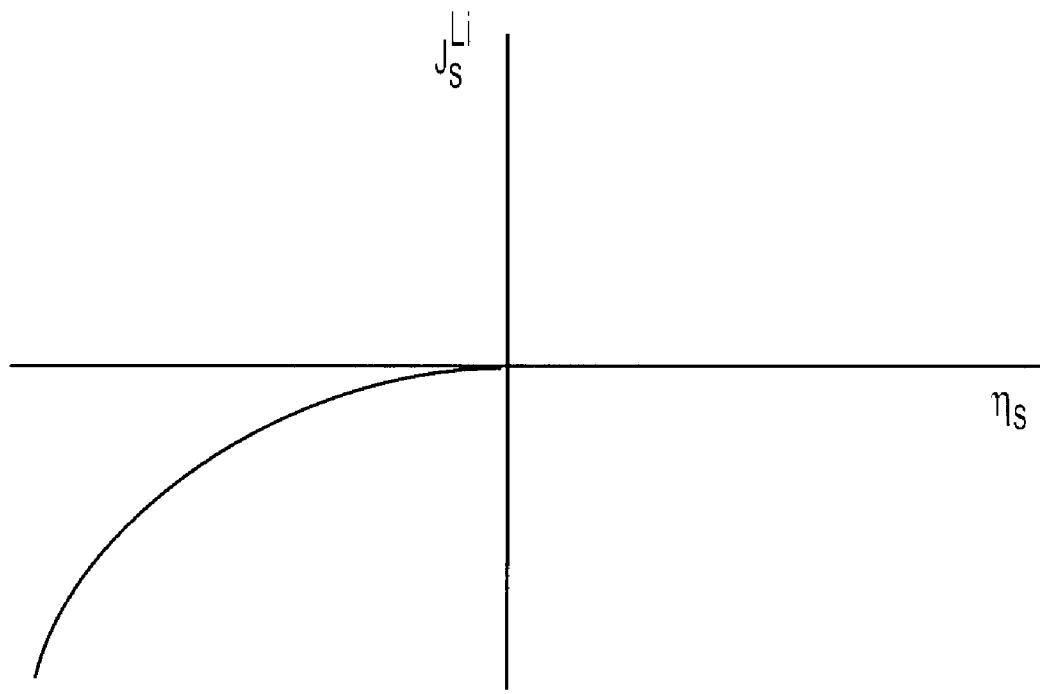
FIG. 4 is a graphical representation of the relationship between overpotential and current density of the irreversible side reaction.

The presently disclosed methods and apparatus utilize the values of $J_S^{Li}$ and $\eta_S$ to control the charging of the Li ion cell. The relationship between the values of $J_S^{Li}$ and $\eta_S$ can be graphically represented in FIG. 4.

The relationship of the current densities ($J_n$ and $J_p$) at the surface of the respective active electrode material and the current at the battery terminal ($I_b$) can be expressed as follows:

$$J_n = J_n^{Li} + J_s^{Li} = -\frac{I_b}{S_n} \tag{8}$$

$$J_p = J_p^{Li} = \frac{I_b}{S_p} \tag{9}$$

where Sj is the surface of the active material at n (negative electrode) and p (positive electrode.)

The relationship between the battery terminal voltage ($V_b$) and the solid phase potentials ($\Phi_n$ for the negative electrode and $\Phi_p$ for the positive electrode) can be expressed as follows:

$$Vb = \Phi p - \Phi n \tag{10}$$

The various relationships set forth above between the sensor outputs ($I_b$ and $V_b$) and the internal model parameters can be used to update and recalculate the parameters in real time.

The presently disclosed method can utilize the model set forth above to calculate the current density of the side reaction which, in turn, can be used to calculate the charging efficiency, $K_{eff}$. The charging efficiency is equal to the current density of the side reaction, $J^{Li}_n$, divided by the current density of the negative electrode, $J_n$. When the charging efficiency is less than a given value then the charging is suspended; this is the one of the conditions of the presently disclosed method.

The second condition of the presently disclosed method can be the overpotential of the side reaction at the negative electrode, such as, the deposition of Li and the reduction of EC. The overpotential of the side reaction can be expressed as:

$$\eta_s = \Phi_n^1 - U_s^{OCP} - J_n S_n R_n^f \tag{11}$$

where Rn is the resistance of the negative electrode. According to the presently disclosed method, when the overpotential, $\eta_s$, of the side reaction is less than a given value then charging is suspended.

In the present method, if either one of the above conditions is met, that is, the charging efficiency, $K_{eff}$, is less than a first given value, or the overpotential, $\eta_s$, of the side reaction is less than a second given value, then the charging of the battery is suspended.

For a 4.2V Li ion cell, the charging efficiency, $K_{eff}$, can have a lower limit, or first given value ranging between about 50% and about 100%, and the overpotential, $\eta_s$, of the side reaction can have a lower limit, or second given value ranging between about 0 volt and about 0.5 volt.

Figure 5:
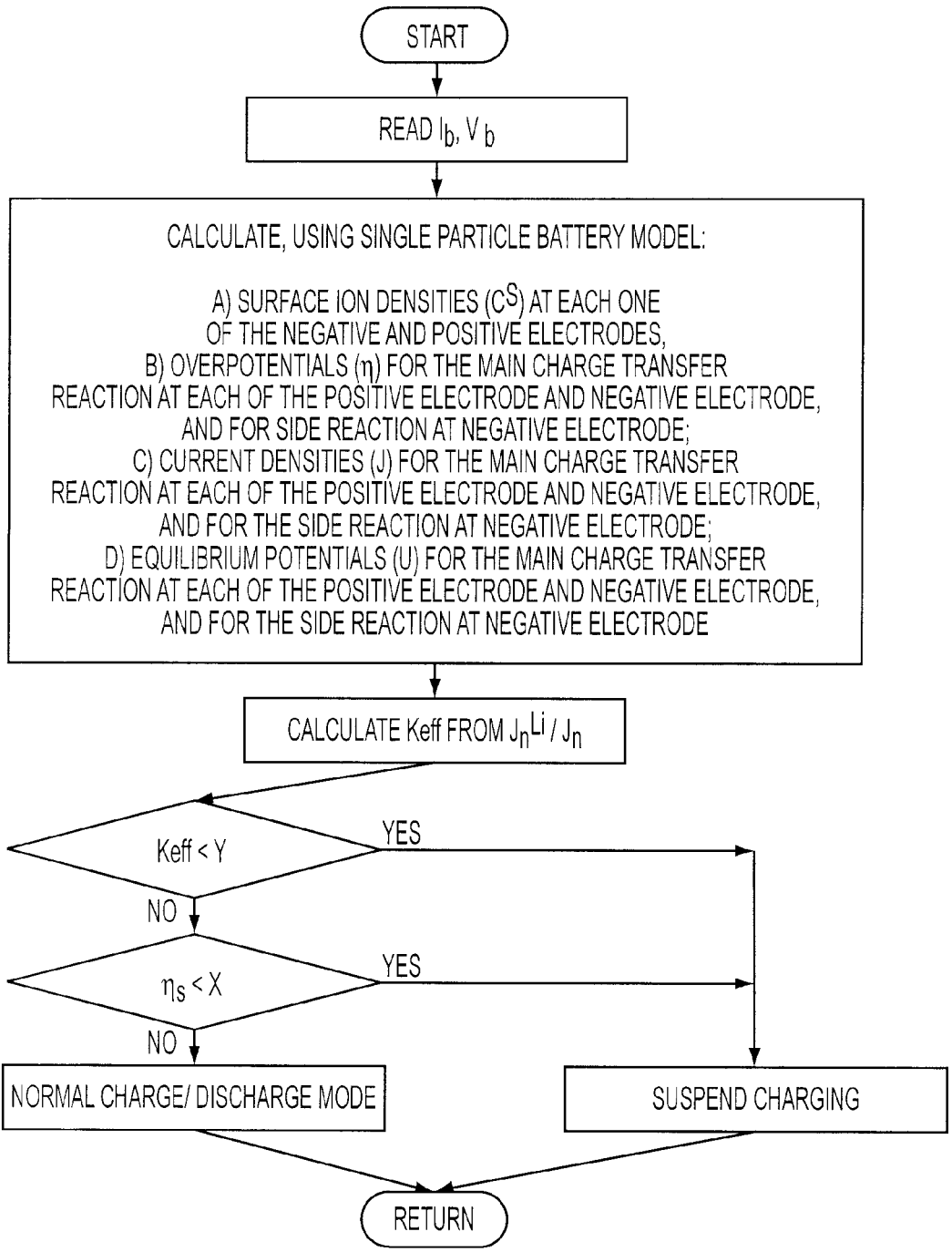
FIG. 5 is a flow chart of one embodiment of the presently disclosed method.

A flow chart illustrating the calculation flow of one embodiment of the present method is set forth in FIG. 5. In this flow chart, the first given value is represented by Y, and the second given value is represented by X.

Figure 6:
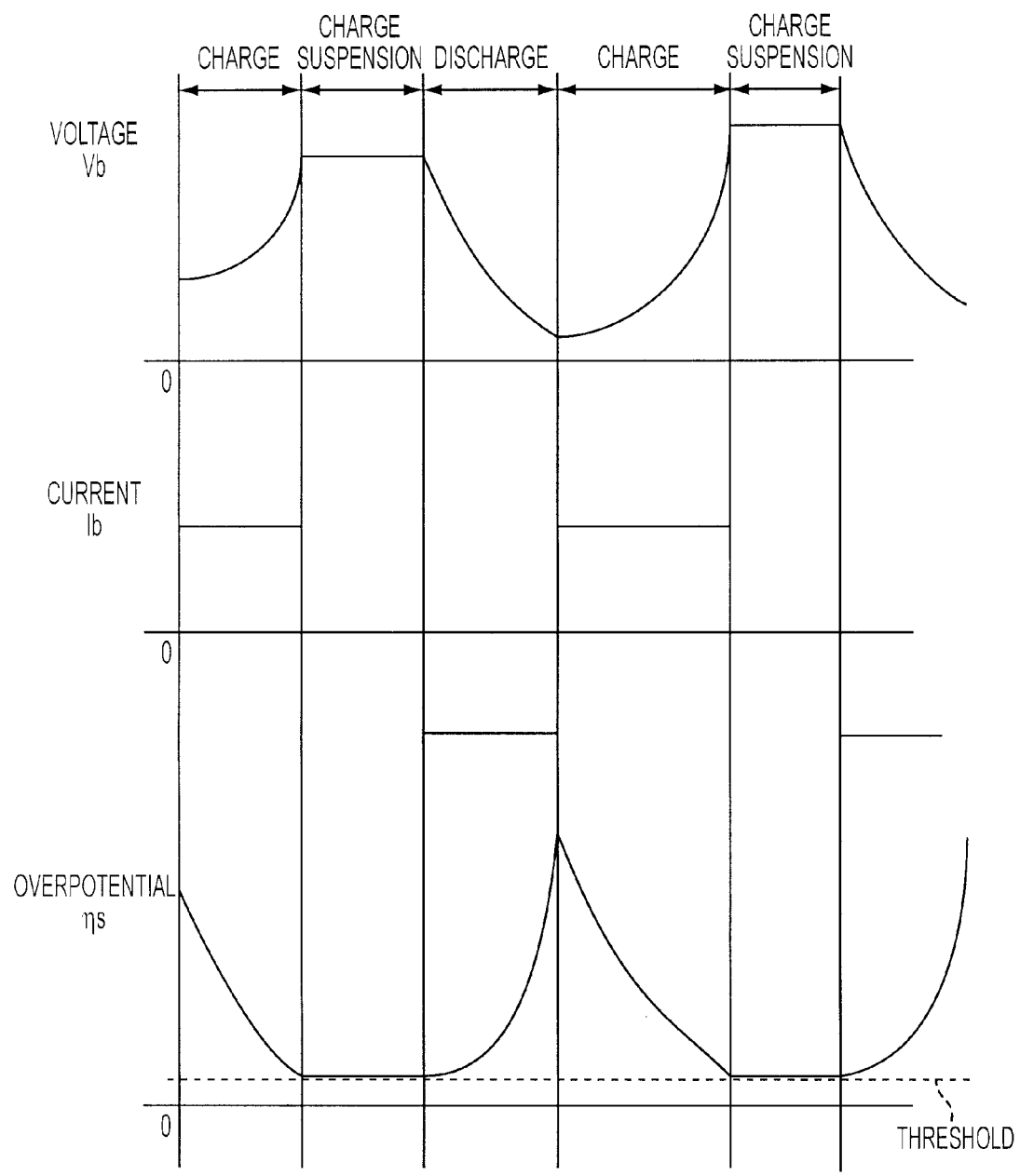
FIG. 6 is a time chart illustrating the change over time for various battery parameters.

A time chart illustrating the change over time for the voltage, $V_b$, the current, $I_b$, and the overpotential of the side reaction, $\eta_s$, is presented in FIG. 6.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What I claim is:

1. A machine implemented method for controlling the charging of a battery comprising:
    receiving current and voltage output information for the battery during a charging/discharging cycle at a certain time interval,
    using a model to determine charging efficiency of the battery and the overpotential for a side reaction,
    determining whether the charging efficiency is less than a first given value,
    determining whether the overpotential of the side reaction is less than a second given value, and
    suspending the charging of the battery if either charging efficiency or overpotential is less than their respective given values.

2. The machine implemented method according to claim 1, wherein the battery comprises a lithium ion battery.

3. The machine implemented method according to claim 1, wherein the side reaction comprises an irreversible side reaction.

4. The machine implemented method according to claim 3, wherein the irreversible side reaction comprises the formation of deposits at the negative electrode.

5. The machine implemented method according to claim 3, wherein the deposits at the negative electrode comprise lithium-containing components.

6. The machine implemented method according to claim 3, wherein the deposits at the negative electrode comprise the reduction products of ethylene carbonate.

7. The machine implemented method according to claim 1, wherein if charging is not suspended, then the receiving of current and voltage output information at a certain time interval is repeated until charging is suspended.

8. The machine implemented method according to claim 1, wherein the model comprises the single particle battery model.

9. The machine implemented method according to claim 8, further comprising
    determining additional internal parameters comprising at least one member selected from the group consisting of:
    surface ion densities at each of the negative and positive electrodes,
    overpotentials for the main charge transfer reaction at each of the positive electrode and negative electrode,
    overpotential for the side reaction,
    current densities for the main charge transfer reaction at each of the positive electrode and negative electrode,
    current density for the side reaction,
    equilibrium potentials for the main charge transfer reaction at each of the positive electrode and negative electrode, and
    equilibrium potential for the side reaction.

10. A battery charging device for a battery comprising:
    a battery;
    a battery charger for charging the battery; and
    a charging control means comprising
        receiving current and voltage output information for the battery during a charging/discharging cycle at a certain time interval,
        using a model to determine charging efficiency of the battery and the overpotential for a side reaction,
        determining whether the charging efficiency is less than a first given value,
        determining whether the overpotential of the side reaction is less than a second given value, and
        suspending the charging of the battery if either charging efficiency or overpotential is less than their respective given values.

11. A battery charging device for a battery according to claim 10, wherein the battery charger for charging the battery comprises a generator.

12. A battery charging device for a battery according to claim 10, wherein the battery charger for charging the battery comprises a generator for a hybrid electric vehicle.

13. A machine implemented method for controlling the charging of a battery comprising:
    receiving current and voltage output information for the battery during a charging/discharging cycle at a certain time interval,
    using a model to determine charging efficiency of the battery,
    determining whether the charging efficiency is less than a first given value, and
    suspending the charging of the battery if the charging efficiency is less than the first given value.

14. The machine implemented method according to claim 13, further comprising:
    using the model to determine the overpotential for a side reaction,
    determining whether the overpotential of the side reaction is less than a second given value, and
    suspending the charging of the battery if either charging efficiency or overpotential is less than their respective given values.

15. The machine implemented method according to claim 13, wherein the battery comprises a lithium ion battery.

16. The machine implemented method according to claim 13, wherein the side reaction comprises an irreversible side reaction.

17. A machine implemented method for controlling the charging of a battery comprising:
    receiving current and voltage output information for the battery during a charging/discharging cycle at a certain time interval,
    using a model to determine the overpotential for a side reaction,
    determining whether the overpotential of the side reaction is less than a first given value, and
    suspending the charging of the battery if the overpotential is less than the first given value.

18. The machine implemented method of claim 17, further comprising:
    using the model to determine charging efficiency of the battery, determining whether the charging efficiency is less than a second given value, and suspending the charging of the battery if either charging efficiency or overpotential is less than their respective given values.

19. The machine implemented method according to claim 17, wherein the battery comprises a lithium ion battery.

20. The machine implemented method according to claim 17, wherein the side reaction comprises an irreversible side reaction.

* * * * *